350-96.27

XR  3,703,660

United S[tates Patent]  TX 3076N

Fyler

[15] 3,703,660

[45] Nov. 21, 1972

[54] PHOTOCHROMIC FIBER OPTIC IMAGE STORAGE DEVICE

[72] Inventor: Norman F. Fyler, Deerfield, Ill.

[73] Assignee: Corning Glass Works, Corning, N.Y.

[22] Filed: Aug. 19, 1971

| | | |
|---|---|---|
| 3,589,793 | 6/1971 | Curtiss......................65/DIG. 7 |
| 3,630,765 | 12/1971 | Araujo....................106/DIG. 6 |

Primary Examiner—Roy Lake
Assistant Examiner—Siegfried H. Grimm
Attorney—Clarence R. Patty, Jr. et al.

[57] ABSTRACT

INVENTOR.
Norman F. Fyler
BY
ATTORNEY

INVENTOR.
Norman F. Fyler
BY
ATTORNEY

PHOTOCHROMIC FIBER OPTIC IMAGE STORAGE DEVICE

BACKGROUND OF THE INVENTION

The present invention relates to cathode ray tube image storage and display systems and more particularly to photochromic fiber optic plates suitable for disposition within the cathode ray tube of such a system or suitable for use as the cathode ray tube faceplate.

Optical image storage and display devices are known which utilize a thin, normally transparent, photochromic plastic film that is rendered opaque when subjected to ultraviolet light. The photochromic film is often disposed adjacent to the faceplate of a cathode ray tube (CRT) having a phosphor which generates ultraviolet light, a dichroic filter being disposed between the faceplate and photochromic film for reflecting visible light and transmitting ultraviolet light. Light directed toward the photochromic film is either absorbed by the film, or it is reflected by the dichroic filter, passes back through the transparent areas of the photochromic film and is displayed on a screen.

Since the useful lifetime of organic photochromic films is quite limited, it is preferable to utilize for the storage medium a plate of photochromic glass which may be subjected to actinic radiation indefinitely without fatigue. Moreover, since photochromic glass, unlike organic photochromic materials, does not outgas when it is disposed within a CRT, it can be employed as the target substrate onto which the CRT phosphor is applied, thus permitting the maximum transfer of radiated energy from the phosphor to the photochromic glass plate. However, photochromic glass does not have a sufficiently high density of darkening centers and therefore must be used in relatively large thicknesses in order to provide sufficient optical density to create a displayed image having adequate contrast. The radiation pattern from a conventional phosphor screen is nearly Lambertian; thus, as the radiated light from the phosphor penetrates such a relatively thick homogeneous sheet of photochromic glass, it spreads and causes a darkened image of poor resolution. A solution to this problem is disclosed in the publication entitled "A New Time-Sharing Terminal" by G. K. Megla and D. R. Steinberg, *Information Display*, Vol. 7, Part I — Sept/Oct. 1970, pp. 15–19 and 32 & Part II — Nov/Dec. 1970, pp. 31–33 and 54, wherein a cathode ray tube display system utilizes a photochromic fiber optic plate that is disposed adjacent to the inside of the CRT faceplate. In this system the target substrate is a fiber optic plate wherein each fiber has a photochromic glass core. Since that light from the phosphor which is within the acceptance angle of the fiber optic is trapped and confined to a few photochromic fiber cores, light spreading is reduced and the resolution of the resultant image is significantly better than that provided by a plate of bulk photochromic glass of equivalent optical density.

The maximum thickness of a photochromic fiber optic plate is limited by the optical density of undarkened photochromic glass. The optical characteristics of presently available photochromic glasses are such that the thickness of a conventional photochromic fiber optic plate cannot be made great enough to provide sufficient mechanical strength for the plate to be used as a CRT faceplate. Since information is erased from photochromic glass by subjecting the same to red and infrared light, heat tends to remain in a plate which is disposed within a CRT, thus adversely affecting such characteristics as image retention time. Maximum transfer of heat from a photochromic plate could be achieved if the plate could be used as the CRT faceplate.

When the CRT phosphor is disposed on a photochromic fiber optic plate, the amount of light radiated by the phosphor that is trapped in a fiber core can be described by the acceptance efficiency of the fiber which is related to the numerical aperture or acceptance angle thereof. As is the case with conventional fiber optics, the efficiency of light collection of a photochromic fiber optic can be approximately characterized by its numerical aperture for meridional light rays, given by the equation $$N.A. = n_a \sin\theta = \sqrt{n_o^2 - n_c^2} \qquad (1)$$

where $n_a$, $n_o$ and $n_c$ are the refractive indices of the medium exterior fiber optic, the core material, and the cladding material, respectively, and $\theta$ is the acceptance half-plane angle of the fiber optic. Since the spacial radiation from the phosphor screen can be approximated by the cosine distribution of a Lambertian source, the "acceptance efficiency" of the photochromic fiber optic can be defined as the ratio of the portion of light accepted by the fiber optic from a Lambertian source to the total radiated light from the Lambertian source and is given by the equation $$N_a = \frac{\frac{\pi R^3 \sin^2\theta}{3}}{\frac{\pi R^3}{3}} = \sin^2\theta \qquad (2)$$

where $R$ is the radius of the polar radiation sphere of the Lambertian source. It can be assumed that the phosphor screen is not in optical contact with the photochromic fiber optic plate although the phosphor has a significant degree of optical contact with the plate. Therefore, $n_a$ can be set equal to 1 and the substitution of Equation (1) into Equation (2) gives the following equation $$N_a = n_o^2 - n_c^2 \qquad (3)$$

Core and cladding refractive indices for a typical photochromic fiber optic are $n_o = 1.63$ and $n_c = 1.53$. Substitution of these quantities in Equation (3) gives an acceptance efficiency of slightly better than 30 percent for these conventional materials. This corresponds to a numerical aperture of 0.56 and an acceptance half-plane angle of 34°. Thus, most of the light radiated by the phosphor is not trapped by the photochromic core; rather, it may be directed laterally and not enter the photochromic fiber optic plate, it may enter the fiber cladding or it may enter the core at angles greater than the acceptance angle and be refracted into adjacent cores, thereby reducing the resolution of an image projected from such plate. The amount of light radiated by the phosphor and entering into adjacent fibers must be substantially reduced if an image storage system is to provide an image of acceptable quality.

SUMMARY OF THE INVENTION

It is therefore an object of the present invention to provide an improved fiber optic plate which utilizes photochromic glass to good advantage to increase inter-fiber optical isolation, to produce high contrast, high resolution images and to achieve maximum thermal transfer of heat generated during the erasing process. Another object is to provide a photochromic fiber optic cathode ray tube faceplate. Another object of the present invention is to provide an image storage and display device utilizing an improved fiber optic plate wherein photochromic glass is utilized in a unique fiber optic construction.

Briefly, the image storage device of the present invention comprises a plurality of light conducting fibers secured together in side-by-side relation to form a fiber optic plate, corresponding opposite ends of the fibers cooperating to define first and second end faces. Each of the fibers comprises a glass core and a layer of photochromic glass formed upon the surface of the core. Means are provided for supporting the fiber optic plate.

The layer of photochromic glass may function as a sheath having a refractive index substantially the same as that of the core or it may have a refractive lower than that of the core. The core glass may consist of a photochromic glass or a non-absorbing glass. The disclosed fiber optic device may be utilized as a faceplate of a cathode ray tube if the core consists of a non-absorbing glass. In any of the disclosed embodiments a thin sheet of high density photochromic glass may be disposed adjacent to one of the faces to provide increased darkening efficiency.

DESCRIPTION OF THE PREFERRED EMBODIMENTS

The present invention relates to image storage plates comprising optical fibers incorporating photochromic glass, some embodiments having two distinct types of photochromic glasses. U.S. Pat No. 3,208,860 constitutes a basic disclosure relative to photochromic glasses. That patent describes, in particular, inorganic silicate glasses containing submicroscopic crystals of the silver halides, viz., silver chloride, silver bromide, and silver iodide, which become darker in color when the glass is subjected to actinic radiation but which regain their original color when the actinic radiation is removed and/or the glass is exposed to radiations of different wavelengths. Photochromic glass usually becomes darkened or activated by exposure to ultraviolet radiation, and the darkened areas can be bleached or erased by red or infrared radiation. The information contained in the glass persists therein for reasonable times while the glass is being read by passing therethrough radiation of a neutral wavelength which is usually green light. The optical density obtainable in photochromic glasses is directly related to the concentration of radiation-sensitive crystals therein. Unfortunately, as pointed out in U.S. Pat. No. 3,208,860, high concentration of silver and halides in the glass result in the formation of silver halide crystals of such large size as to scatter light from the visible portion of the spectrum passing therethrough and, in doing so, cause the glass to become translucent or opaque. The quantity limitations of silver and halides found applicable in that patent to assure the production of a transparent photochromic glass comprise a maximum of 0.7 and 0.6 percent by weight as analyzed, respectively of silver and the sum of the halides. Some photochromic glasses have been developed which differ from the glasses disclosed in U.S. Pat. No. 3,208,860 in that they have higher refractive indices, different fade rates, or they respond to different activating and bleaching wavelengths. However, such glasses have not been able to provide optical densities appreciably different from those of the glasses disclosed in said patent. Those photochromic glasses capable of providing optical densities similar to those of the glasses of said patent are hereinafter referred to as either "conventional photochromic glasses" or simply "photochromic glass." Other developments in photochromic glasses including new compositions and/or thermal treatment techniques have resulted in photochromic glasses capable of providing optical densities significantly greater than those of the glasses disclosed in said patent, and these glasses are hereinafter referred to as "high density photochromic glasses" which presently must be formed in relatively thin sheets suitable for forming tubes or plates that can be used in the process of making fiber optic plates.

Figure 1:
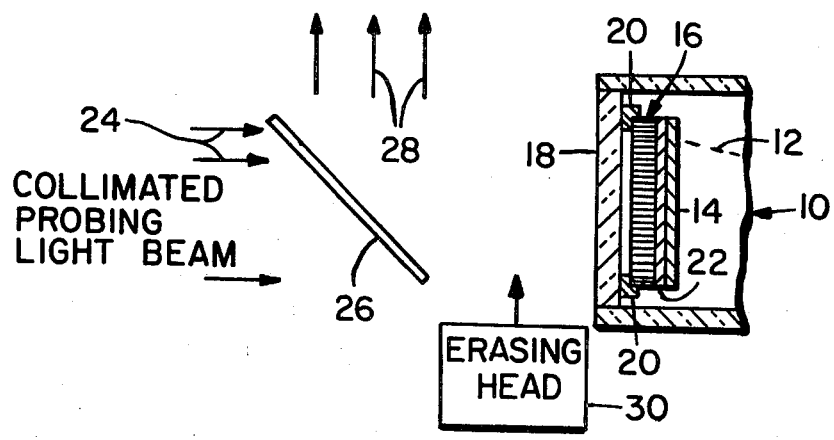
FIG. 1 is a diagrammatic view of an image storage system embodying a photochromic fiber optic plate made in accordance with the present invention.

FIG. 1 illustrates an image storage and display system suitable for incorporating the improved photochromic fiber optic plate of the present invention and is similar to the system described in the aforementioned Megla et al. publication. Cathode ray tube 10 has an electron beam 12 which, by conventional techniques, scans a phosphor layer 14 while its amplitude is modulated in accordance with information to be displayed. A photochromic fiber optic plate 16 is disposed a small distance from faceplate 18 by supports 20. Plate 16 comprises a plurality of fibers each of which incorporates photochromic glass in a manner to be hereinafter described. Disposed between phosphor layer 14 and plate 16 is a coating 22 of dichroic filter material which may be formed on plate 16 by an evaporating technique. Dichroic coating 22 is typically a multilayered film which is so constructed that it passes ultraviolet light and reflects green light.

Ultraviolet light, which is generated by electron beam 12 penetrating phosphor layer 14, passes through dichroic coating 22 and darkens photochromic material in selected ones of the fibers, thereby storing an image in plate 16 which is determined by those of the fibers containing darkened or activated photochromic material. Information is read out of the plate 16 by projecting a collimated beam of green probing light represented by arrows 24 through a beam splitter 26 so that it projects through faceplate 18 and into the fibers of plate 16 within the acceptance angle thereof. The direction of the probing light beam is preferably parallel to the axes of the fibers. The probing light is reflected from dichroic layer 22 and passes back through the fibers of the plate 16, portions of the probing light beam being attenuated by passing twice through those fibers which have been darkened by ultraviolet light generated by phosphor layer 14. The image containing light beam represented by arrows 28 is reflected by beam splitter 26 to an optical system (not shown) whereby an image may be directly viewed or projected.

Information can be erased from the photochromic fiber optic plate by temporarily disposing in front of the faceplate 18 an erasing head 30 which is an optical cavity containing quartz iodide lamps and a red filter. Both red and infrared light emitted by the erasing head bleach or erase the information stored in the photochromic fiber optic plate. Alternatively, if the cathode ray tube 10 is employed in a constantly varying display system such as a plan position indicator, a photochromic glass having a relatively high normal fade rate may be employed. In such a system, the collimated probing light beam 24 may contain some bleaching light in addition to the neutral green light and erasing head 30 may be omitted.

A conventional photochromic fiber optic plate is described in copending patent application Ser. No. 801,562 filed Feb. 24, 1969, now U.S. Pat. No. 3,630,765 in the name of R. J. Araujo, commonly assigned herewith. That application teaches a family of photochromic glasses exhibiting a refractive index sufficiently greater than 1.52 to be effective as a core element in an optical fiber. In addition to possessing a relatively low refractive index, a cladding glass should be compatible with the core glass. Generally, the thermal coefficient of expansion of the cladding glass is important since a bad mismatch of the expansion coefficients of the core and cladding often leads to poor bonding and crazing of the cladding during fiber manufacture. When the core glass is a photochromic glass, a cladding glass must be selected which will not poison or deleteriously effect the photochromic properties of the core glass. Moreover, it is sometimes desirable to utilize an absorbing cladding glass which absorbs ultraviolet light since this type of radiation is utilized to activate or darken the photochromic glass cores of conventional photochromic fiber optic plates. Alternatively, it may be desirable to utilize a non-absorbing cladding glass which is highly transmissive to ultraviolet light and to use an extra mural absorbing (EMA) cladding glass which absorbs ultraviolet light. This latter type of fiber permits a high resolution image to be written into the photochromic fiber optic plate. Families of glasses suitable for use as ultraviolet absorbing cladding and non-absorbing cladding are described in copending application Ser. No. 115,370 filed Feb. 16, 1971 in the names of R. J. Araujo and L. A. Sawchuk, commonly assigned herewith.

Figure 2:
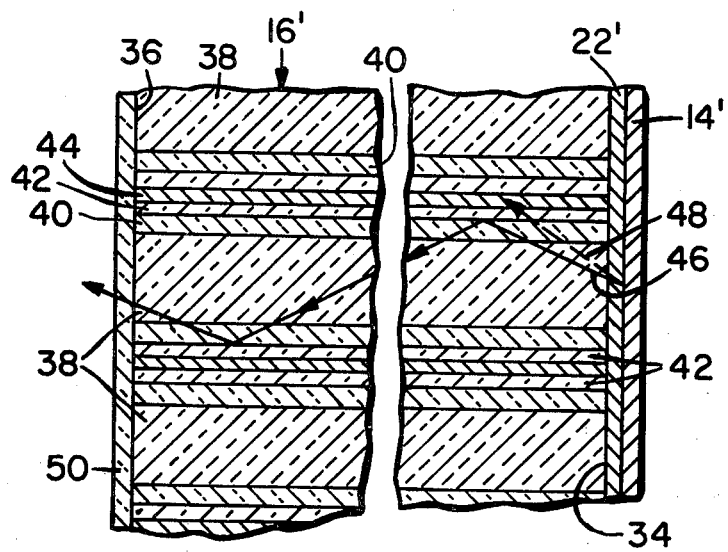
FIG. 2 is an enlarged vertical sectional view of a portion of a discrete fiber optic image storage plate which may be utilized in the image storage system of FIG. 1.

Referring to FIG. 2, there is illustrated an embodiment of a photochromic fiber optic plate which may be utilized as the plate 16 in FIG. 1, similar elements being designated by primed reference numerals. The fiber optic plate 16' comprises a plurality of fibers secured together in side-by-side relation so that corresponding opposite ends of the fibers cooperate to define opposing faces 34 and 36. Each fiber consists of a core 38 of conventional photochromic glass capable of achieving a given maximum optical density and a sheath 40 of high density photochromic glass capable of providing when activated a maximum optical density greater than that of core 38, the refractive indices of both core 38 and sheath 40 being relatively high. Families of glasses suitable for use as the photochromic sheath 40 are described in copending application Ser. No. 65,271 filed Aug. 19, 1970 in the names of R. J. Araujo, L. G. Sawchuk and T. P. Seward, commonly assigned herewith. This application discloses a family of high refractive index photochromic glasses which can be formed into sheets of glass having high concentrations of darkening centers. Photochromic sheath 40 is surrounded by a layer 42 of non-absorbing cladding glass having a relatively low index of refraction as described in said aforementioned Araujo et al. application Ser. No. 115,370. A layer 44 of EMA cladding glass may be utilized to absorb ultraviolet light passing from one core to another through the cladding.

A thin sheet 50 of high density photochromic glass may be disposed adjacent to face 36 of fiber optic plate 16'. Although any of the embodiments to be hereinafter described may be provided with a photochromic sheet such as sheet 50, certain embodiments utilizing transparent core glass probably benefit to the greatest extent by the addition of such a sheet. Families of glasses suitable for use as the photochromic sheet 50 are described in the aforementioned Araujo et al. application Ser. No. 65,271 and in U.S. Pat. No. 3,449,103 issued June 10, 1969 to S. D. Stookey. Sheet 50 should be thin enough that it does not appreciably reduce image resolution due to light spreading. Rather, it enhances the image projected from the fiber optic plate by increasing the contrast thereof since it increases the optical density of darkened areas of the plate.

The fiber optic plate illustrated in FIG. 2 becomes activated in the following manner. Some of the light rays such as ray 46 which are generated by phosphor layer 14' are within the acceptance angle of the fibers and are there propagated therethrough under the process of total internal reflection. Ray 46 is substantially losslessly reflected from the interface between sheath 40 and cladding layer 42. There is substantially no change in direction of ray 46 as it passes through the interface between core 38 and sheath 40 since the refractive indices of these two glasses are quite similar. As ray 46 passes through the core 38 and sheath 40 it darkens that photochromic glass through which it passes, thereby contributing to the formation of an image in plate 16'. Ray 46 also darkens that portion of sheet 50 through which it passes as it emerges from the fiber. However, light rays such as ray 48 which enter the fiber at an angle greater than the acceptance angle will strike the interface between sheath 40 and cladding 42 at an angle smaller than the critical angle of reflection of that interface and will pass into cladding 42. Since ray 48 darkens the photochromic material through which it passes, additional rays which follow the path through which ray 48 had passed will encounter some absorption from the photochromic glass which had been activated by ray 48. Since sheath 40 consists of a relatively high density photochromic material, that portion thereof adjacent to face 34 will be darkened to a great extent, thereby greatly attenuating those light rays entering the fiber at angles greater than the acceptance angle at times after the initial rays such as ray 48 have passed therethrough. In the embodiment shown in FIG. 2 the attenuated portion of ray 48 which passes through photochromic sheath 40 and through cladding 42 is further attenuated by the absorbing layer 44. Thus, in addition to adding to the contrast of an optical image projected from plate 16', photochromic sheath 40 effectively increases the optical isolation between the individual fibers as the ultraviolet exposure effect progresses. Although the plate 16' is relatively difficult to fabricate, the increased interfiber optical isolation and increased optical density provided by sheath 40 may justify this type of plate.

Figure 3:
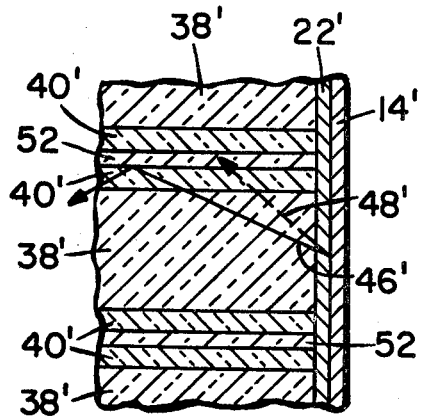
FIGS. 3, 4 and 5 are enlarged vertical sectional views of alternative embodiments of image storage plates which may be utilized in the system of FIG. 1.

The alternative embodiment illustrated in FIG. 3 is similar to that of FIG. 2 and elements common to both figures are indicated by primed reference numerals. This embodiment differs from that of FIG. 2 in that the non-absorbing cladding glass 42 and the layer 44 of absorbing glass are replaced by a single layer 52 of ultraviolet absorbing cladding glass of the type disclosed in the aforementioned Araujo et al. application Ser. No. 115,370. The effects of this embodiment upon light rays 46' which enter the fiber within the acceptance angle thereof and light rays 48' which enter the fiber at angles greater than the acceptance angle thereof differ slightly from the effects of the embodiment of FIG. 2 on these rays. Due to the light absorbing properties of the cladding 52, light ray 46' will suffer losses on each reflection at opposing interfaces of sheath 40' and cladding 52 as it passes through the fiber. These losses depend on the complex Fresnel reflection coefficients, which in turn, depend on the absorption coefficient of the absorbing cladding material 52. Light rays such as ray 48' which enter the fiber at an angle greater than the acceptance angle thereof will strike the interface at an angle smaller than the critical angle thereof and will refract into the absorbing cladding 52 and be attenuated. As described in conjunction with FIG. 2, sheath 40' functions to increase the optical isolation between individual fibers as the exposure effect of the ultraviolet light progresses.

Figure 4:
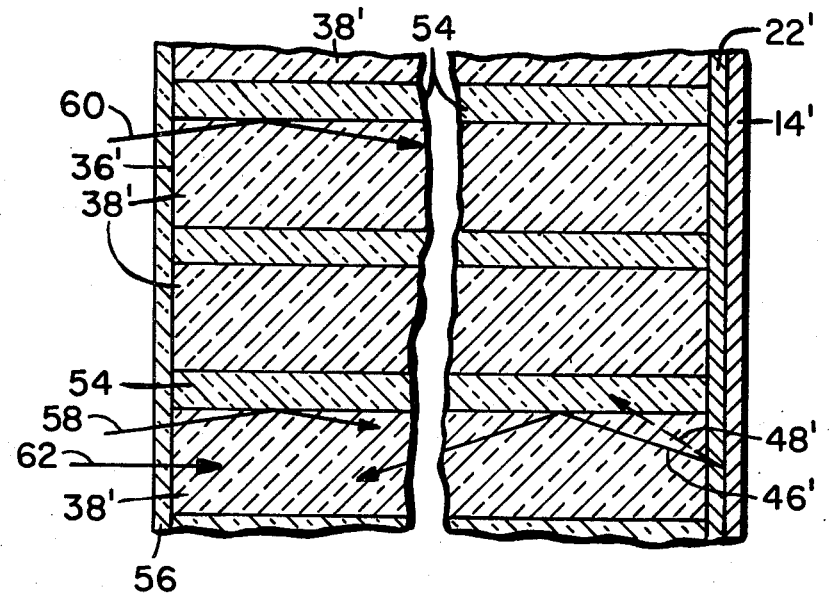

A simplified embodiment is illustrated in FIG. 4 wherein previously described elements are designated by primed reference numerals. In this embodiment a cladding layer 54 of high density photochromic glass having a relatively low index of refraction is formed around the surface of each of the cores 38' of high refractive index photochromic material. Families of glasses suitable for use as the photochromic cladding layer 54 are described in U.S. Pat. No. 3,449,103. A sheet 56 of high density photochromic glass similar to sheet 50 of FIG. 2 may be included in this embodiment.

A ray 46' of ultraviolet light entering a fiber within the acceptance angle thereof reflects from the interface between core 38' and cladding 54 and continues down the fiber. That portion of the cladding material 54 which is disposed closely adjacent to phosphor layer 14' quickly becomes optically dense and thereafter tends to isolate adjacent fibers from ultraviolet light rays 48' which enter the fibers at angles greater than the critical angle thereof. As light rays 46 travel down the fibers by the process of total internal reflection, they darken the photochromic core material through which they pass. Such light rays also darken a surface portion of photochromic cladding 54 due to the finite penetration or tunneling of such light rays into the cladding glass on every reflection.

Light rays 58 and 60 from the probing light source are shown entering two of the fibers, ray 58 entering an activated fiber which has been darkened by ultraviolet light and ray 60 entering a non-activated fiber. Ray 58 is attenuated by passing through the darkened core material and by reflecting from the interface between core 38' and cladding 54 since the surface portion of cladding 54 has been darkened by the previously described ray 46'. Ray 60 travels relatively unattenuated through the fiber which it enters since neither the core material through which it travels nor the surface portion of the cladding material 54 from which it reflects has been darkened by ultraviolet light.

Figure 5:
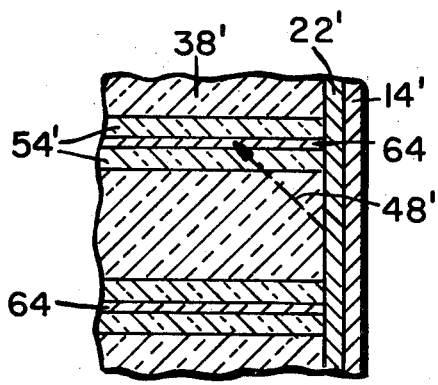

A modification of the photochromic fiber optic plate of FIG. 4 is illustrated in FIG. 5 wherein elements similar to those in FIG. 4 are indicated by primed reference numerals. In this embodiment a layer 64 of EMA cladding is formed upon the surface of layer 54' of high density photochromic glass. The operation of this embodiment is similar to that of FIG. 4 except that ultraviolet light illustrated by ray 48' which enters the fibers at angles greater than the critical angle thereof, is further attenuated by layer 64 after passing through the interface of core 38' and cladding 54'. It is to be understood that any of the embodiments of the present invention may be provided with EMA cladding, although, for the sake of simplicity, all embodiments will not be described as having such an absorbing layer.

Figure 6:
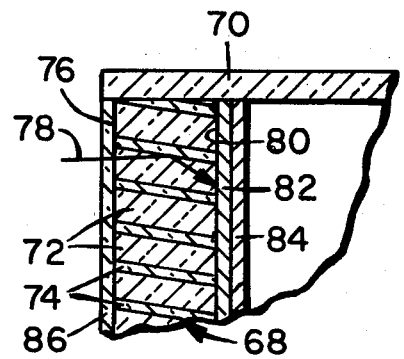
FIG. 6 is a vertical sectional view of a fragmentary portion of a cathode ray tube utilizing a fiber optic image storage faceplate constructed in accordance with the present invention.
Figure 7:
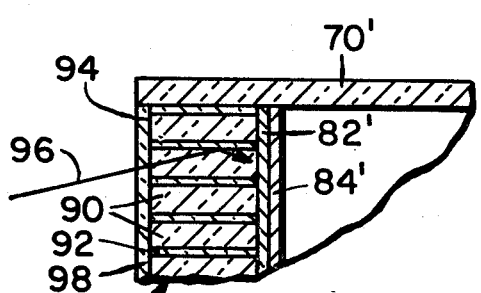
FIG. 7 is a vertical sectional view of a fragmentary portion of a cathode ray tube utilizing an image storage fiber optic faceplate which is a slight modification of the embodiment of FIG. 6.

In the embodiments illustrated in FIGS. 6 and 7 a photochromic fiber optic plate is utilized as the faceplate of a CRT. These embodiments are advantageous in that heat which builds up within a fiber optic plate during the bleaching operation can be readily conducted to the surrounding medium. In FIG. 6 a fiber optic plate 68 is utilized as the faceplate of a cathode ray tube 70. The core 72 consists of highly transparent non-photochromic glass and the cladding material 74 consists of a high density photochromic glass. Since the cores 72 are transparent, the thickness of the fiber optic plate is no longer limited as it was in those embodiments utilizing photochromic glass as the core material. Therefore, the fiber optic plate 68 can be made thick enough to be utilized as the CRT faceplate. The faceplate 68 consists of a plurality of light conducting fibers connected together in side-by-side relation with each other and optically finished at their opposite ends to form an outer face 76 suitable for receiving a probing light beam, one ray 78 of which is illustrated, and a face 80 on which dichroic coating 82 is deposited. A sheet 86 of high density photochromic glass may be disposed adjacent to face 76 as described in conjunction with previous embodiments. Phosphor layer 84 is deposited on the exposed surface of dichroic coating 82. Ultraviolet light generated by the CRT electron beam penetrating phosphor layer 84 passes through dichroic layer 82 and enters the cores 72 in the manner discussed in conjunction with FIG. 4. That light which impinges upon the core-cladding interface at angles less than the critical angle of reflection will be refracted into the high density photochromic cladding, thereby darkening the same so that such cladding will thereafter attenuate ultraviolet light subsequently passing therethrough. That ultraviolet light entering cores 72 and impinging upon the core-cladding interface at angles greater than the critical angle of reflection is continuously reflected from the interface, darkening a thin portion of the high density photochromic cladding on each reflection. Since the core material is non-photochromic, the fibers of plate 68 must have a large aspect ratio so that most of the ultraviolet light passing therethrough is reflected many times, thereby darkening a very long length of photochromic cladding. Ultraviolet light emerging from a fiber darkens that portion of sheet 86 through which it passes.

As discussed in conjunction with FIG. 1, a collimated light beam of green probing light is directed toward the face 76 of plate 68 in a direction substantially perpendicular thereto. Referring momentarily to FIG. 4, probing light ray 62 is shown entering a fiber core parallel to the axis thereof. In the embodiment shown in that figure the photochromic core material would attenuate ray 62 if that core had been previously darkened by ultraviolet light. However, ray 62 could travel through such a core, reflect from the dichroic layer and eminate from face 36' substantially unattenuated if core 38' consisted of non-photochromic glass instead of the disclosed photochromic glass. Only a minimum of attenuation would be provided by sheet 56. Even those rays of probing light which reflect only a few times from the core-cladding interface of a fiber having a non-photochromic core are attenuated only slightly and would therefore erroneously contribute to the projected image and detract from the contrast thereof.

Therefore, the axes of the fibers of plate 68 of FIG. 6 are not perpendicular to faces 76 and 80. A ray 78 of probing light entering a core perpendicular to face 76 is caused to reflect from high density photochromic cladding 74 and is not permitted to pass twice through the non-photochromic core material without undergoing a plurality of reflections at opposing interfaces of the core and cladding, especially since the aspect ratio is very large as previously suggested. It is noted that a large aspect ratio is not demonstrated in FIG. 6 which is highly diagrammatic for the sake of simplicity. However, this figure serves to illustrate the manner in which rays 78 of probing light entering fibers perpendicular to face 76 will be reflected from the core-cladding interfaces.

A slight modification of the system illustrated in FIG. 1 will permit the utilization of the embodiment illustrated in FIG. 7 wherein elements which are similar to those of FIG. 6 are indicated by primed reference numerals. In this embodiment fiber optic plate 88 is utilized as the faceplate of a cathode ray tube 70'. Plate 88 is similar to plate 68 of FIG. 6 in that core material 90 consists of highly transparent non-photochromic glass having a relatively high refractive index and cladding material 92 consists of a high density photochromic glass of relatively low refractive index such as that disclosed in the aforementioned Stookey patent. Since fiber optic plate 88 forms the faceplate of cathode ray tube 70' and since cores 90 are highly transparent, a large aspect ratio is employed. Fiber optic plate 88 may also include a thin sheet 98 of high density photochromic glass which may be secured to face 94 thereof.

The embodiment of FIG. 7 differs from that of FIG. 6 in that the axes of the fibers are substantially perpendicular to the outer face 94 of plate 88. The use of transparent cores 90 precludes utilization of a collimated beam of probing light having a direction parallel to the axes of the fibers. Therefore, the probing light, a ray 96 of which is illustrated in FIG. 7, is directed toward face 94 so that it enters cores 90 at an angle with respect to the axes thereof. The cladding material 92 is activated as described in connection with FIG. 6, ray 96 being caused to undergo a plurality of reflections at opposing interfaces of the core and cladding to thereby darken a thin layer of cladding material. This embodiment is simpler to construct than that of FIG. 6 but can only be utilizes in those systems in which the probing light can be directed as indicated hereinabove.

Each of the fiber optic image storage plates suggested above and described in connection with FIGS. 2-7 can be initially formed of glass rods, strips and tubes of relatively large cross-sectional sizes suitably bunched together. These initially formed parts can then be fused together and drawn down to fiber size, as is well known in the prior art. It is also well known that a plurality of such drawn down fibers can be assembled in like side-by-side manner and fused to form a fiber optic plate. The cross-sectional shape of these fibers can be any shape commonly used in the optical fiber art, including square, circular, hexagonal and the like.

The thin sheet of high density of photochromic glass illustrated in FIGS. 2, 4, 6 and 7 as being attached to that side of the fiber optic plate opposite that on which the phosphor layer is disposed can be sealed to the fiber optic plate by heating both the sheet and fiber optic plate to a sufficiently high temperature and thereafter bringing these two members together or they can be joined by a thin layer of solder glass in accordance with well known techniques. The thin sheet of high density photochromic material can be made thin enough that it does not appreciably reduce image resolution due to light spreading. Rather it causes an increase in image contrast since it increases the optical density of darkened areas of the plate.

I claim:

1. An image storage device comprising a plurality of light conducting fibers secured together in side-by-side relation to form a fiber optic plate, corresponding opposite ends of said fibers cooperating to define first and second end faces, each of said fibers comprising a glass core having a given refractive index and a layer of photochromic glass formed upon the surface of said core, and means for supporting said fiber optic plate.

2. An image storage device in accordance with claim 1 wherein said supporting means comprises a cathode ray tube faceplate having a plurality of supports on which said fiber optic plate is disposed.

3. An image storage device in accordance with claim 1 wherein said supporting means comprises a cathode ray tube envelope which engages a peripheral portion of said fiber optic plate so that said fiber optic plate forms the faceplate of said cathode ray tube.

4. An image storage device in accordance with claim 1 wherein the refractive index of said core glass is substantially the same as that of said photochromic glass layer, said fibers further comprising a layer of cladding glass formed upon the surface of said layer of said photochromic glass, the refractive index of said cladding glass being lower than said given refractive index.

5. An image storage device in accordance with claim 4 wherein said cladding glass is an ultraviolet light absorbing glass.

6. An image storage device in accordance with claim 5 further comprising a thin sheet of high density photochromic glass disposed on said first end face.

7. An image storage device in accordance with claim 4 wherein said cladding glass is a non-absorbing glass, said fibers further comprising an extra mural layer of ultraviolet absorbing material formed upon the surface of said layer of cladding glass.

8. An image storage device in accordance with claim 7 further comprising a thin sheet of high density photochromic glass disposed on said first end face.

9. An image storage device in accordance with claim 1 wherein the refractive index of said layer of photochromic glass is lower than said given refractive index.

10. An image storage device in accordance with claim 9 further comprising a thin sheet of high density photochromic glass disposed on said first end face.

11. An image storage device in accordance with claim 9 wherein said glass core consists of a photochromic glass.

12. An image storage device in accordance with claim 11 further comprising a thin sheet of high density photochromic glass disposed on said first end face.

13. An image storage device in accordance with claim 9 wherein said glass core consists of a photochromic glass capable of providing a given optical density when activated and said layer of photochromic glass consists of a high density photochromic glass which is capable of providing when activated an optical density greater than that of said given optical density.

14. An image storage device in accordance with claim 13 further comprising a layer of ultraviolet absorbing material formed upon the surface of said layer of photochromic glass.

15. An image storage device in accordance with claim 9 wherein said glass core consists of a non-absorbing glass.

16. An image storage device in accordance with claim 15 wherein the axes of said light conducting fibers are perpendicular to said end faces.

17. An image storage device in accordance with claim 16 further comprising a thin sheet of high density photochromic glass disposed on said first end face.

18. An image storage device in accordance with claim 17 further comprising means for directing a collimated beam of probing light toward said first end face, the direction of said beam being non-parallel with the axes of said fibers.

19. An image storage device in accordance with claim 18 wherein said supporting means comprises a cathode ray tube envelope which engages a peripheral portion of said fiber optic plate so that said fiber optic plate forms the faceplate of said cathode ray tube.

20. An image storage device in accordance with claim 19 further comprising a layer of phosphor disposed adjacent to said second end face, said phosphor being capable of radiating ultraviolet light, and a dichroic layer disposed between said second face and said phosphor layer for reflecting green light and passing ultraviolet light.

21. An image storage device in accordance with claim 15 wherein the axes of said light conducting fibers are not perpendicular to said first and second end faces.

22. An image storage device in accordance with claim 21 further comprising a thin sheet of high density photochromic glass disposed on said first end face.

23. An image storage device in accordance with claim 22 further comprising means for directing a collimated beam of probing light toward said first face, the direction of said beam being perpendicular to said first face.

24. An image storage device in accordance with claim 23 wherein said supporting means comprises a cathode ray tube envelope which engages a peripheral portion of said plate so that said plate forms the faceplate of said cathode ray tube.

25. An image storage device in accordance with claim 24 further comprising a layer of phosphor disposed adjacent to said second end face, said phosphor being capable of radiating ultraviolet light, and a dichroic layer disposed between said second face and said phosphor layer for reflecting green light and passing ultraviolet light.

* * * * *